United States Patent

Magnin et al.

[11] Patent Number: 5,436,944
[45] Date of Patent: Jul. 25, 1995

[54] DEVICE AND METHOD FOR MONITORING THE INTERNAL SURFACE OF A TUBULAR PIECE

[75] Inventors: Bernard Magnin, Saint Victor; Joseph Lara, Montanay, both of France

[73] Assignee: Framatome, France

[21] Appl. No.: 165,858

[22] Filed: Dec. 14, 1993

[30] Foreign Application Priority Data

Dec. 28, 1992 [FR] France .................. 92 15788

[51] Int. Cl.⁶ .............................................. G21C 17/00
[52] U.S. Cl. ..................... 376/249; 376/258; 376/450; 376/451
[58] Field of Search ............... 376/258, 249, 255, 450, 376/451; 976/DIG. 43; 73/582

[56] References Cited

U.S. PATENT DOCUMENTS

| | | | |
|---|---|---|---|
| 4,045,283 | 8/1977 | Noyes et al. | 376/239 |
| 4,231,419 | 11/1980 | Gugel | 165/11 A |
| 4,566,585 | 1/1986 | Dreher et al. | 198/624 |
| 4,673,027 | 6/1987 | Vermaat | 165/11.2 |
| 4,684,493 | 8/1987 | Gravelle | 376/252 |
| 4,741,878 | 5/1988 | Gebelin et al. | 376/248 |
| 5,145,637 | 9/1992 | Richardson et al. | 376/249 |
| 5,279,168 | 1/1994 | Timm | 73/866.5 |

FOREIGN PATENT DOCUMENTS

| | | |
|---|---|---|
| 0039922 | 11/1981 | European Pat. Off. . |
| 0411874 | 2/1991 | European Pat. Off. . |
| 2186709 | 5/1973 | France . |
| 2336681 | 7/1977 | France . |
| 2012959 | 8/1979 | United Kingdom . |

Primary Examiner—Donald P. Walsh
Assistant Examiner—Meena Chelliah
Attorney, Agent, or Firm—Pollock, Vande Sande & Priddy

[57] ABSTRACT

The device includes a first tubular support (11) carrying on its outside surface means for fixing to a handling tool, a second tubular support (18) mounted coaxially inside the first support (11) for rotation about its axis. A flexible strip (55) carrying a monitoring probe at one of its ends is engaged in a slideway support carried by the second support (18) and including an end part (65) mounted to pivot about an axis which is perpendicular to the axis (25) of the second support (18). The strip (55) is moved translationally along the axial direction (25) by a conveyor bolt (53). The inside surface of the tubular piece (3) is monitored by moving the probe fixed to the end of the flexible strip (55) rotationally about the axis (25) and in axial translation, inside the annular space (8) between the sleeve (5) and the tubular piece (3).

10 Claims, 7 Drawing Sheets

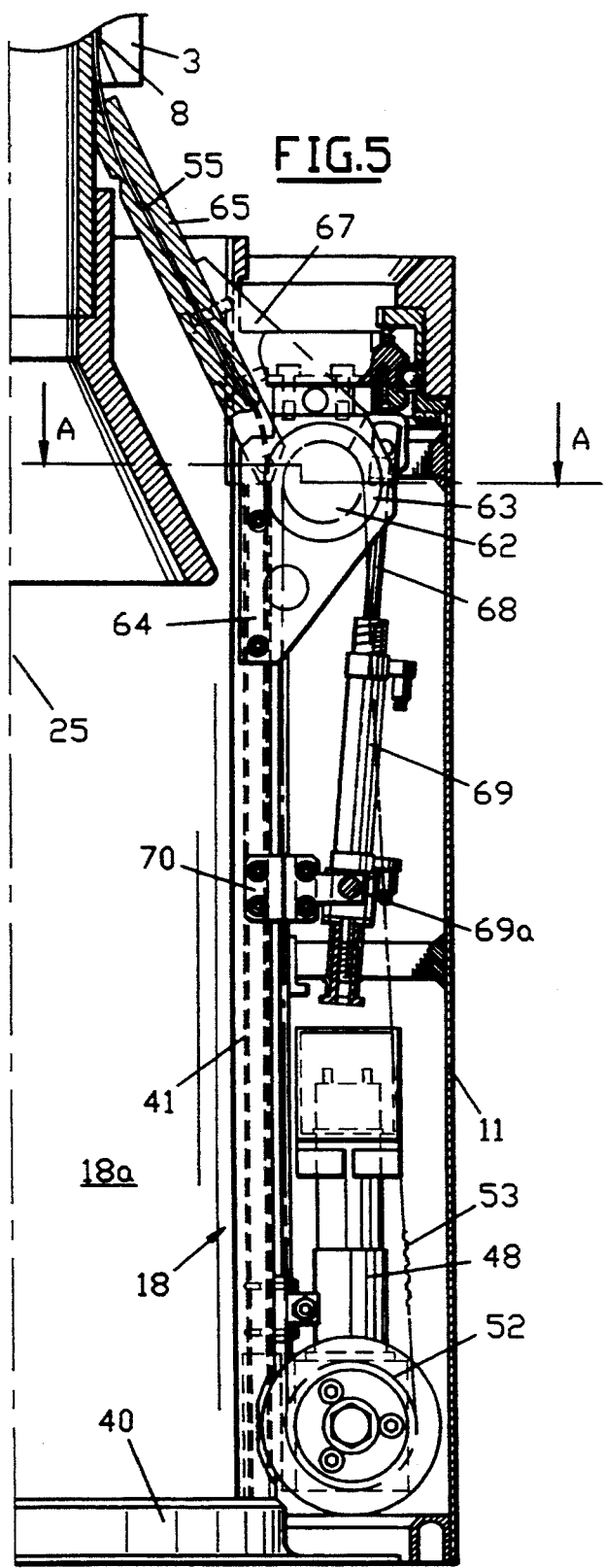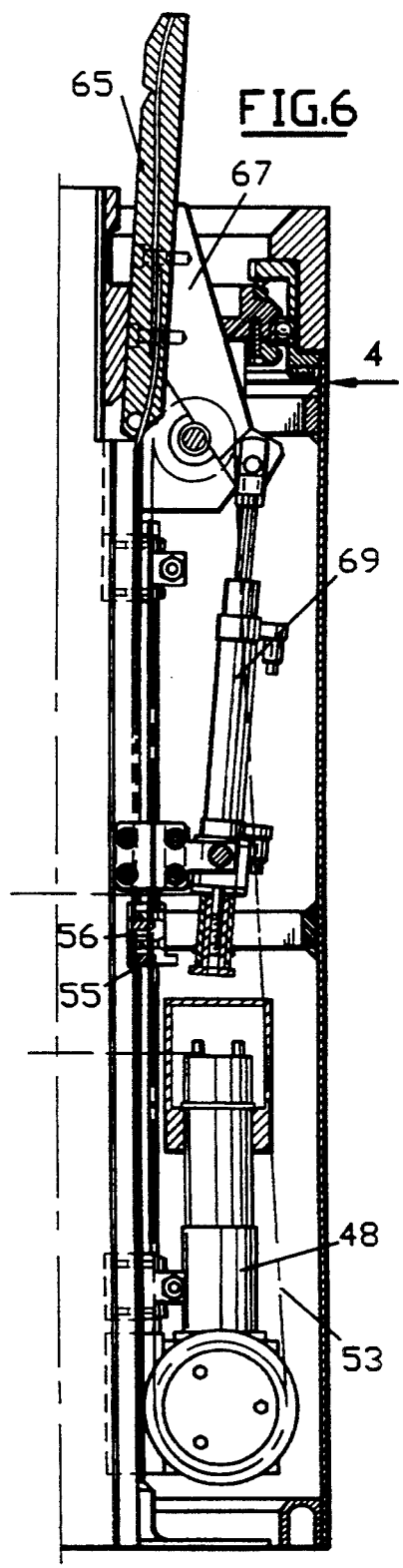

5,436,944

DEVICE AND METHOD FOR MONITORING THE INTERNAL SURFACE OF A TUBULAR PIECE

FIELD OF THE INVENTION

The invention relates to a device and to a method for monitoring the internal surface of a tubular piece and in particular of a tubular penetration piece for the head of the vessel of a nuclear reactor which is cooled by pressurized water.

BACKGROUND OF THE INVENTION

Pressurized-water nuclear reactors generally comprise a vessel enclosing the core of the reactor which is immersed in the pressurized cooling water of the core of the reactor.

The vessel of the reactor of overall cylindrical shape comprises a head of hemispherical shape which may be attached onto its upper part. The head is pierced with openings in the region of each of which there is fastened, by welding, a tubular penetration piece constituting an adaptor providing the passage for and controlling the movement of an extension of a control cluster for the reactivity of the core or a penetration passage for a means for measurement inside the core, such as a thermocouple column.

To the end parts of each of the adaptors, there are fastened mechanisms for controlling movement of the control clusters for the reactivity of the core.

Inside each of the tubular penetrations of the vessel head there is fastened, in a position which is coaxial with respect to the tubular penetration piece and with a certain radial clearance, a thermal sleeve which comprises a diametrically flared part coming to rest on a diametrically flared bearing surface located at the upper part of the bore of the tubular penetration piece and which is mounted to rotate freely inside the penetration piece.

The extensions of the rods for controlling the reactivity of the nuclear reactor pass through the vessel head inside thermal sleeves which are themselves arranged coaxially inside adaptors for the control rods or more generally inside tubular penetration pieces of the head.

In order to increase the reliability and operational safety of nuclear reactors and to extend the durability of these reactors, plant operators are led to carry out more and more numerous inspections of the various elements making up the nuclear reactor.

In particular, it may be necessary to monitor the state of the penetration pieces of the head of the vessel in order to be sure of the integrity of these pieces after a certain operational time of the reactor, in particular in the zone where these tubular pieces are welded onto the vessel head.

This monitoring, which must make it possible to detect and to repair defects on the internal surface of the tubular penetration piece, must be carried out from inside the bore of the tubular piece and may consequently necessitate dismantling the thermal sleeve to gain access to the inside surface of the penetration bore.

Monitoring and repairs are carried out during a shutdown of the nuclear reactor, the head of the vessel having been dismantled and placed at the level of an intervention stand.

The dismantling of the thermal sleeve requires complex operations, insofar as the flaring of the thermal sleeve resting on a bearing surface arranged at the upper part of the adaptor prevents the dismantling of the sleeve by pulling downwards, on its lower part which is accessible below the head.

Furthermore, it is also impossible to dismantle the sleeve by pulling upwards, insofar as the cluster control mechanisms which are fixed by screwing and by welding onto the upper parts of the adaptors prevent the passage of the thermal sleeve.

It is therefore desirable to limit the complex dismantling operations of the thermal sleeves to those adaptors which effectively exhibit defects requiring repair.

The operations for monitoring penetration pieces from inside their bore may be carried out effectively by using monitoring probes such as ultrasound probes or Eddy current probes insofar as these probes may be placed opposite or in contact with the inside surface of the bore of the penetration piece.

In French Patent Application No. 92 02405 filed Feb. 28, 1992 by FRAMATOME and Electricite France, it was proposed to make at least one longitudinal slit through the wall of the sleeve by machining the sleeve from the inside, to insert a monitoring probe into the sleeve level with the slit, and to monitor by moving the thermal sleeve in rotation about its axis inside the tubular piece and by moving the probe in translation along the length of the slit.

It was also proposed to effect the repair of the tubular piece such as an adaptor in the event of defects being detected, through the slit made in the sleeve.

Such a method presents numerous advantages with respect to the method requiring dismantling of the thermal sleeve but it nevertheless remains necessary to machine the sleeve in order to make the slit.

SUMMARY OF THE INVENTION

It is an object of the invention to propose a device for monitoring the internal surface of a tubular penetration piece for the head of the vessel of a nuclear reactor which is cooled by pressurized water, fixed by a weld to the head of the vessel, inside which penetration piece there is mounted a coaxial thermal sleeve with radial clearance, the tubular piece including a lower end part projecting beneath the head placed in the monitoring position after dismantling, and the thermal sleeve having an end part projecting from the lower end part of the tubular piece, this device making it possible to monitor without having to dismantle the thermal sleeve and without prior machining of this sleeve.

To this end, the device according to the invention includes:

a first tubular support carrying, on its external surface, means for fixing to a handling tool providing a movement in any direction whatsoever in space, a second tubular support the inside diameter of which is greater than the diameter of the projecting part of the thermal sleeve, the second support being mounted in a coaxial position and able to rotate about its axis inside the first support, at least three arms mounted so as to pivot on the second support about an articulation pin which is perpendicular to the axis of the second support carrying rolling-contact bearing means, driving means for rotating the second support about its axis, a flexible strip carrying a monitoring probe at one of its ends, means for supporting and guiding the flexible strip, which means are carried by the second support and are arranged and fixed on the second support in a direction which is substantially parallel to its axis, including an end part mounted so as to pivot about a pin perpendicular to the axis of the second support, means for moving the strip in translation along the axial direction of the guide means, means for moving the pivoting arms, means for folding the end part of the means for guiding the flexible strip down into the service position, and means for controlling the rotational movement of the second support and the translational movement of the flexible strip, the handling tool making it possible to place the device in a service position in which the second support surrounds the lower end of the tubular piece.

BRIEF DESCRIPTION OF THE DRAWINGS

In order to make the invention easy to understand, there will now be described, by way of example, with reference to the appended drawings, one embodiment of a device according to the invention and its implementation for monitoring a penetration adaptor of the head of a pressurized-water nuclear reactor.

FIG. 5 is a side elevation in the direction of arrow 5 of FIG. 4.

FIG. 6 is a section view of the guiding and moving means represented in FIG. 5, in a second operational position.

DESCRIPTION OF THE PREFERRED EMBODIMENT

Figure 1:
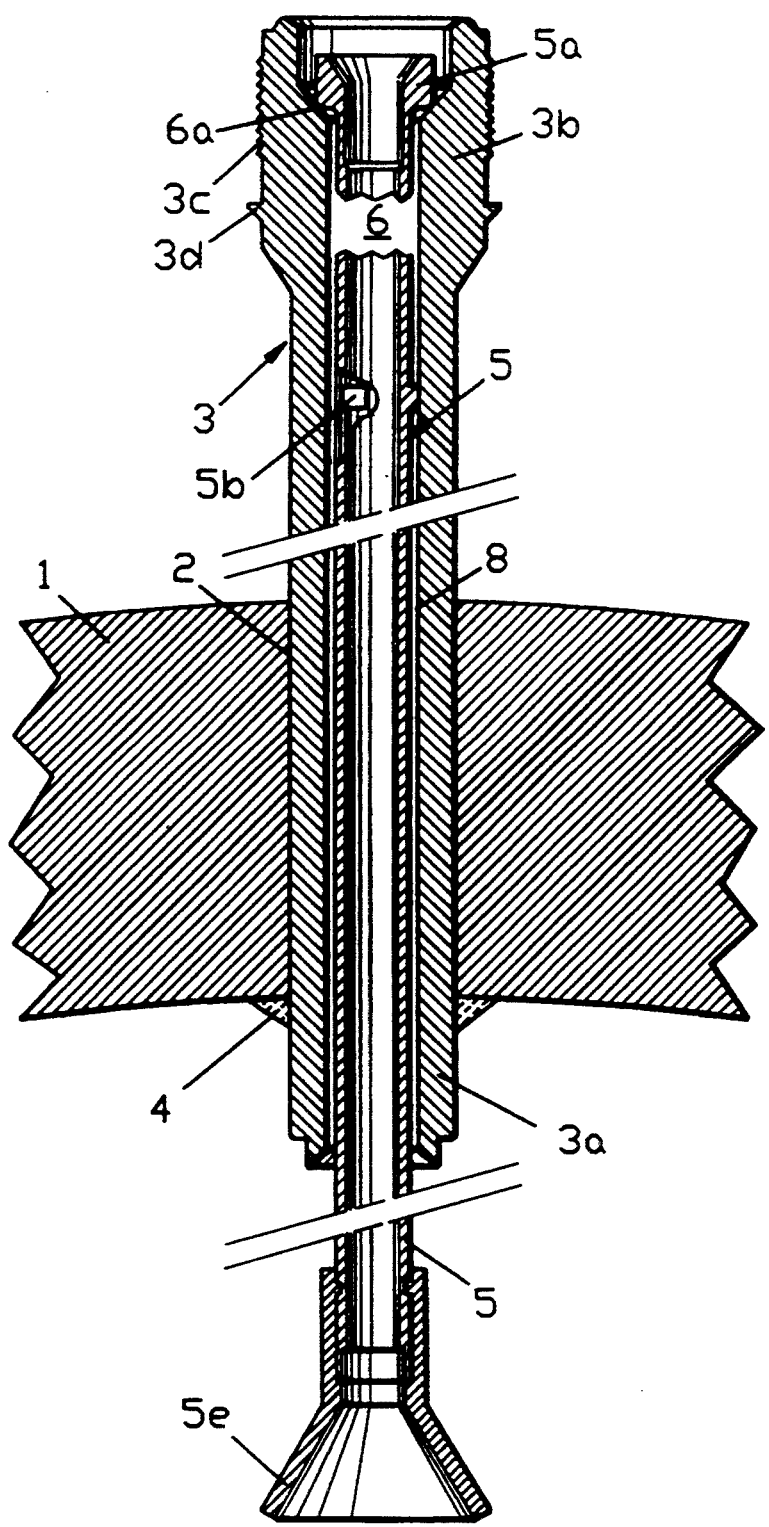
FIG. 1 is a sectional view through an axial plane of a penetration adaptor of the head of the vessel of a pressurized-water nuclear reactor.

FIG. 1 shows part of a head 1 of a vessel of a pressurized-water nuclear reactor which is penetrated by an opening 2 inside which is fixed a tubular piece 3 constituting an adaptor allowing the passage of an extension providing the movement of a control cluster inside the vessel of a nuclear reactor.

The adaptor 3 includes a continuous part 3a whose diameter corresponds to the diameter of the opening 2 and which is fixed by an annular weld bead 4 onto the lower inside face of the head 1, so as to project with respect to this lower inside face. The adaptor 3 includes a diametrically flared upper part 3b located outside and above the head of the vessel 1.

A tubular thermal sleeve 5 is arranged coaxially inside the internal bore of the adaptor 3.

The thermal sleeve 5 includes a diametrically flared upper part 5a coming to rest on a frustoconical bearing surface 6a constituting the upper part of the internal bore 6 of the tubular adaptor 3.

The sleeve 5 additionally includes, on its outside surface, at least one set of three centering pins 5b projecting radially outwards, arranged at 120° to one another with respect to the axis of the sleeve 5 and coming to bear against the inside surface of the internal bore 6 of the adaptor 3 when the sleeve 5 is mounted inside the adaptor.

The sleeve 5 has an external diameter which is substantially smaller than the inside diameter of the bore 6 so that an annular space 8 of constant width remains between the external surface of the sleeve 5 held in an arrangement which is perfectly coaxial with the bore 6 by the pins 5b and the internal surface of the bore 6.

In some cases, the lower part of the bore of the adaptor has a frustoconical shape and is connected to an upper cylindrical part.

The diametrically widened upper part 3b of the adaptor 3 includes, on its external surface, a screw thread 3c and a lip 3d projecting with respect to the external surface of the part 3b.

The mechanism for controlling the adaptor 3 allowing movement of the extension and of the control cluster passing through the head inside the adaptor is fixed to the upper part of the adaptor 3 by screwing onto the threaded part 3c and bearing on the lip 3d.

The fixing of the control mechanism is supplemented by a weld bead for sealing providing the joint between the mechanism and the adaptor along the lip 3d.

The thermal sleeve 5 is secured at its lower part, below the vessel head and the lower part of the adaptor 3, to a centering cone 5e allowing, when the head 1 is placed on the vessel of the reactor, centering of the ends of the cluster control rods constituting extensions of these clusters engaged in the vertical direction inside the core of the reactor arranged inside the vessel.

After the reactor has been in operation for a certain time, it is desirable to check the state of the adaptors penetrating the vessel head, and in particular that part of the adaptors at the level of which the fixing to the vessel head is effected, by means of an annular weld 4.

This monitoring, essentially relating to the internal surface of the bore 6 of the adaptor in the weld zone 4, may be effected by moving a probe, such as an Eddy current probe, along the inside surface of the bore 6 of the adaptor.

The device according to the invention which will be described hereinbelow makes it possible to carry out the monitoring by scanning the inside surface of the adaptor without having to dismantle the thermal sleeve 5 beforehand.

Figure 2A:
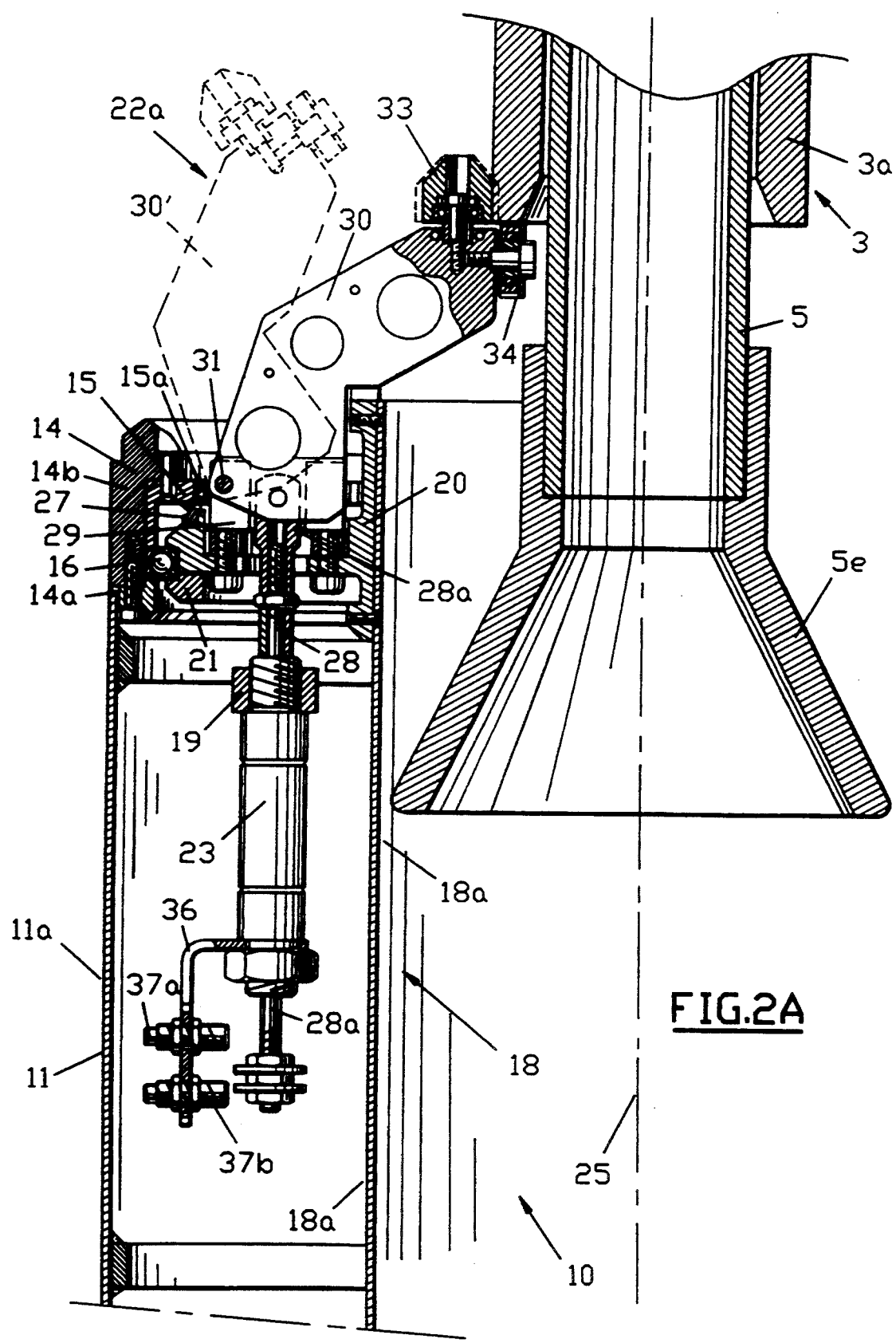
FIGS. 2A and 2B are respectively the left-hand and right-hand parts of section 2—2 of FIG. 3, showing the device according to the invention in the service position under the lower part of an adaptor such as that represented in FIG. 1.
Figure 2B:
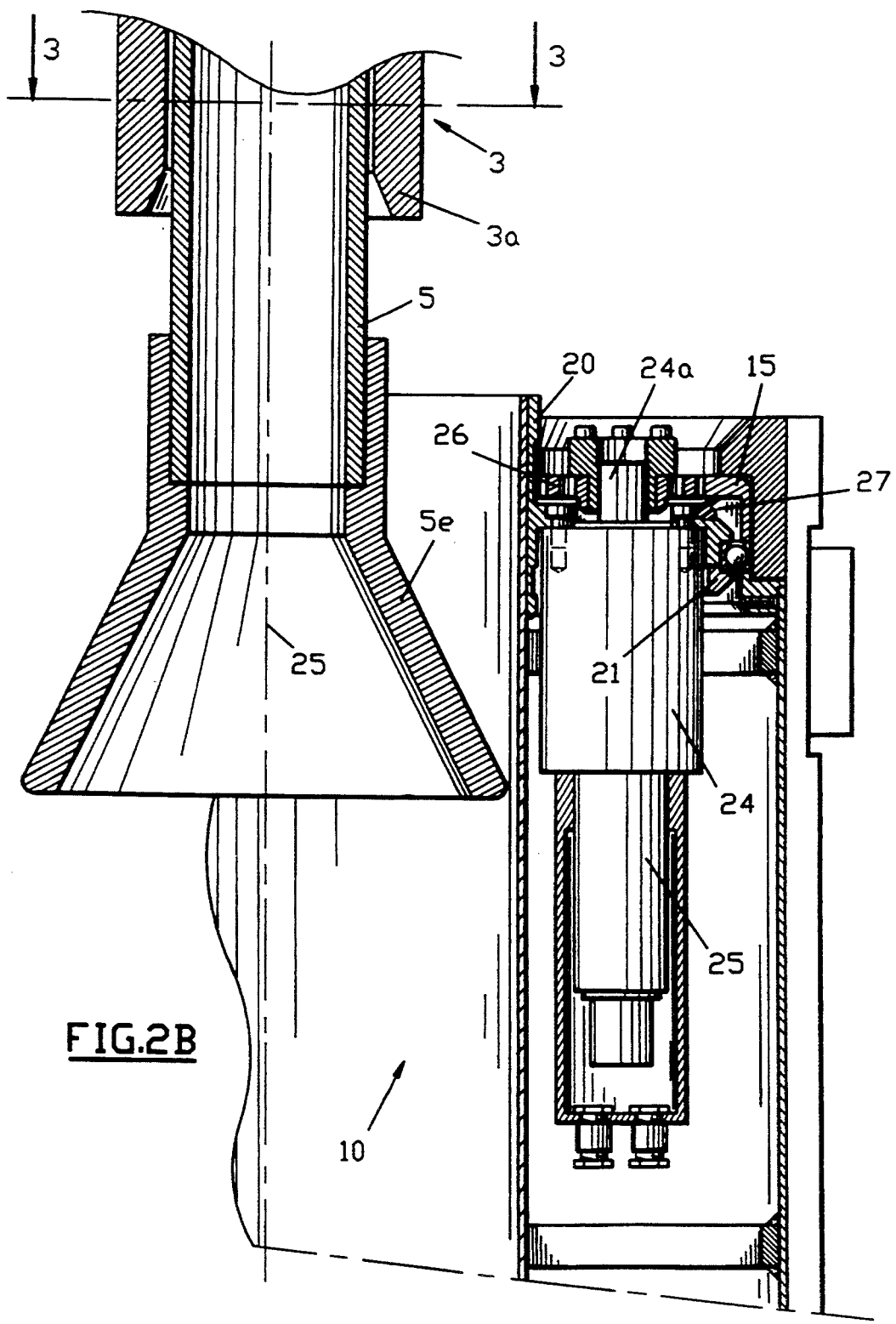
Figure 3:
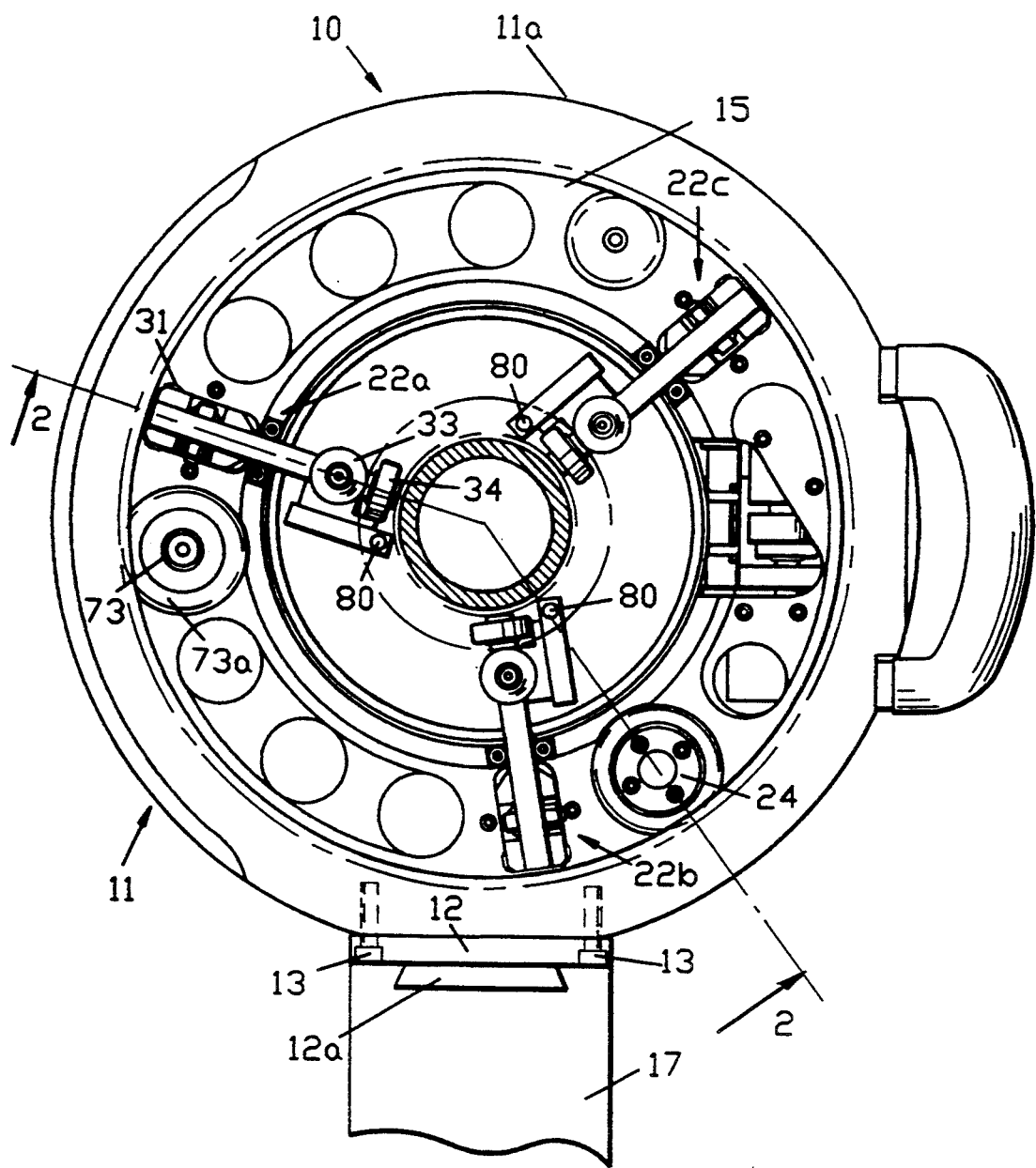
FIG. 3 is a plan view along line 3—3 of FIG. 2B.

FIGS. 2A, 2B and 3 represent the assembly of the monitoring device 10 according to the invention.

The device includes a first annular support 11 mainly consisting of a ferrule 11a, on the lateral surface of which a fastening assembly 12 is fixed by screws 13. The fastening assembly 12 including a dovetail-shaped part 12a makes it possible to fix the monitoring device 10 according to the invention to the end of a handling arm 17 by means of which the device 10 may be moved in any direction whatsoever in space.

The handling tool 17 of the monitoring device 10 may consist of an anthropomorphic arm such as the Aramis arm designed and developed by Babcock and Wilcox Nuclear Services.

The monitoring of the inside surface of an adaptor 3, such as represented in FIGS. 1, 2A and 2B is carried out after dismantling the head 1 from the vessel of the nuclear reactor and after depositing the head on an intervention stand including lateral walls making it possible to isolate the lower surface of the vessel head under which the part 3a of the adaptor and the lower part of the thermal sleeve 5 project. The lateral wall of the intervention stand includes an opening through which the handling arm mounted on a movable support is inserted.

The monitoring device 10 fixed to the end of the arm by means of the fastening assembly 12 is positioned by the handling arm so as to become engaged around the lower part of the thermal sleeve 5, as will be explained hereinafter.

The ferrule 11a of the first annular support 11 carries at its upper part an annular support assembly 14 consisting of a first annular piece 14a fixed by screws onto the ferrule 11a and of a second annular piece 14b fixed by screws onto the annular piece 14a.

A ring gear 15 is fixed by screws onto the annular piece 14b coaxially with the support assembly 14 and the ferrule 11a.

The ring gear 15 includes teeth 15a on its internal surface. Between the annular pieces 14a and 14b the external race of a ball, bearing 16, having a coaxial arrangement with respect to the assembly 14 and to the ferrule 11a of the support 11, is fixed by clamping.

The monitoring device 10 includes a second tubular support 18 consisting mainly of a ferrule 18a. A sheath 20 is fixed by screws onto the external surface of the ferrule 18a at its upper part.

The sheath 20 includes a tubular internal part fixed onto the ferrule 18a, an annular external part and a disc-shaped intermediate part.

Between the external part of the sheath 20 and an annular piece 21 there is interposed and fixed the internal race of the ball-bearing 16 providing the mounting for the second support 18 inside the first support 11, in a coaxial arrangement and so that the second support 18 can move rotationally about its axis inside the first support 11.

The sheath 20 also carries three guidance assemblies with pivoting arms 22a, 22b, 22c mounted at 120° from one another about the axis which is common to the supports 11 and 18 and which may be actuated by thrust cylinders 23 represented in FIG. 2A, the body of which is mounted so as to oscillate by means of a support 19 secured to two suspension rods (not shown) fixed onto the sheath 20.

In its service position, shown in FIGS. 2A, 2B and 3, the device 10 is placed by the handling arm in an arrangement such that the second tubular support 18 or internal support is engaged over the end part 5e of the thermal sleeve 5, in an arrangement which is perfectly coaxial with the sleeve 5 and the adaptor 3.

The second support 18 may be driven rotationally about the axis 25 which is common to the first and second supports and to the adaptor 3 by a geared reduction motor 24 fixed to the central disc-shaped part of the sheath 20.

The output shaft 24a of the geared reduction motor 24 carries a gear 26 keyed onto the shaft 24a. The gear 26 meshes with the teeth 15a of the ring gear 15 so that the rotation of the geared reduction motor 24 drives the rotational movement of the sheath 20 and that of the assembly of the support 18 about the axis 25 inside the external support 11 fixed to the end of the handling arm.

The sheath 20 also carries, on its external part, a lip seal 27 arranged coaxially with respect to the support 18 and to the support 11 and whose lip rubs on the lower part of the ring gear 15 when the second support 18 rotates inside the first support 11.

There will now be described, with reference to FIGS. 2A and 3, the guidance device 22a with pivoting arms, the devices 22b and 22c being identical to the device 22a.

The device 22a includes an arm 30 secured to a rotation pin 31 mounted for horizontal rotation inside a clevis 29 fixed by screws onto the disc-shaped intermediate part of the sheath 20.

The thrust cylinder 23 includes a rod 28 the end part 28a of which constitutes a clevis connected in an articulated manner to the arm 30 by means of a pin which is parallel to the pin 31. The thrust cylinder 23 makes it possible to move the arm 30 between a service position represented in solid line in FIG. 2A and an out-of-service position 30' represented in broken line.

The end of arm 30 carries two rollers 33 and 34 mounted so as to rotate about mutually perpendicular axes on the arm 30.

In the service position of the arm 30, the roller 33, which has a cylindro-frustoconical shape, comes into contact via its cylindrical part with the outside surface of the end 3a of the adaptor 3. The roller 34, of cylindrical shape comes into contact with the horizontal lower end of the adaptor 3.

The arms 22a, 22b and 22c held in the folded-down service position by the thrust cylinders 23 provide perfect guidance of the second support 18 as it moves rotationally inside the first support 11.

The upper part of the monitoring device consisting of the guide rollers 33 and 34 is held in contact with the lower part of the adaptor by means of the handling arm.

The pivoting arms 30 of the guidance device are perforated in order to limit the mass of these arms.

The body of the thrust cylinder 23 carries a detector support 36 at its lower part on which there are mounted two detectors 37a and 37b making it possible to detect the presence of metal references carried by an extension 28a of the rod 28 of the thrust cylinder.

It is thus possible to detect remotely whether the arms of the guidance devices 22a, 22b and 22c are in their raised out-of-service position or in their service position, it being possible for the contact with the end part of the adaptor to be identified by detectors 80 (FIG. 3).

There will now be described, with reference to FIGS. 2A, 2B, 4, 4A, 4B, 5, 5A and 6, the means for guiding and moving the flexible strip carrying a sensor of the Eddy current type at its end.

The ferrule 18a of the second support 18 carries at its lower end a belt 40 on which rests the lower part of a slideway support 41 fixed by screws onto the belt 40.

Figure 4:
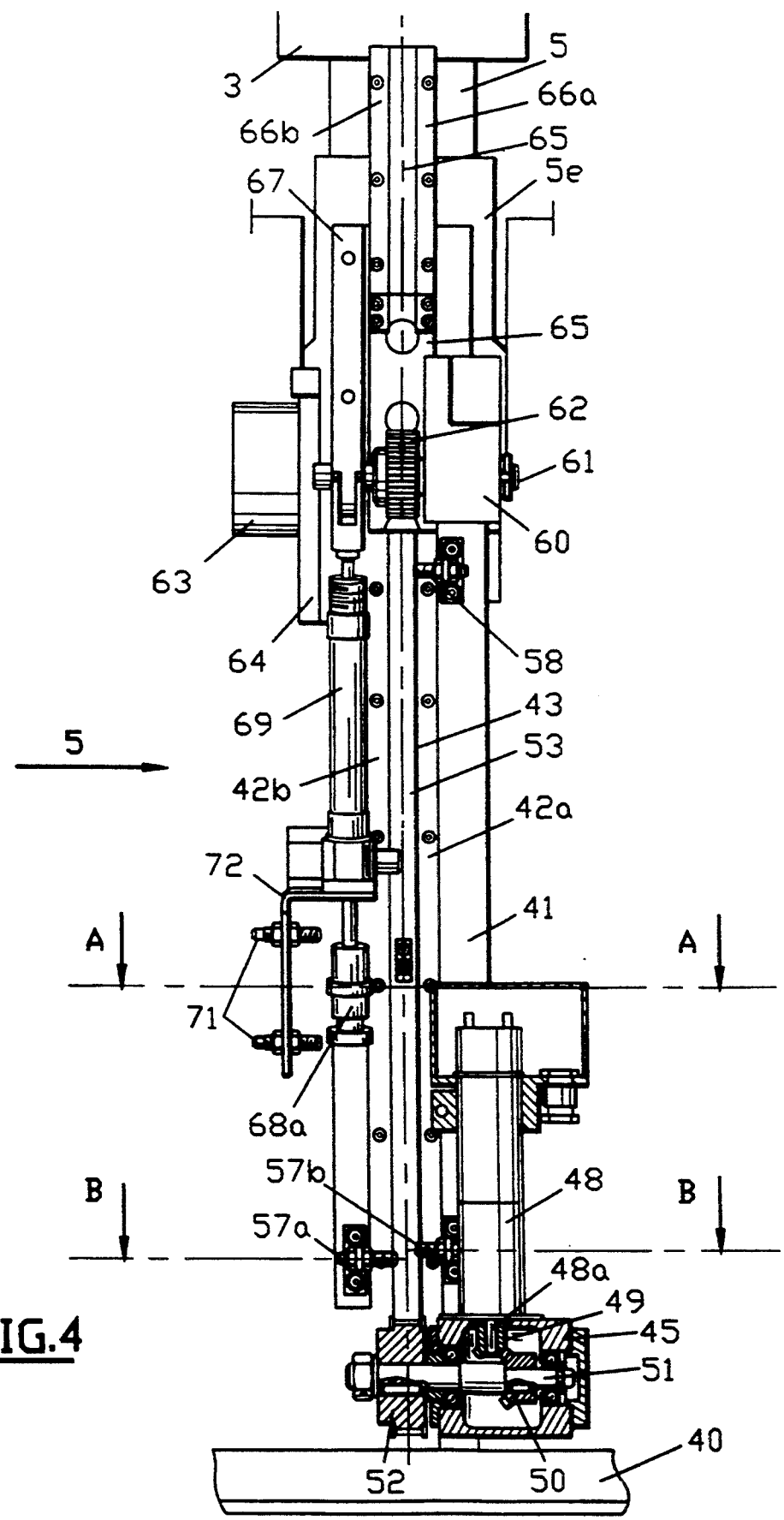
FIG. 4 is an elevation of 4 of FIG. 6, showing the means for guiding and moving the flexible strip of the device.
Figure 4A:
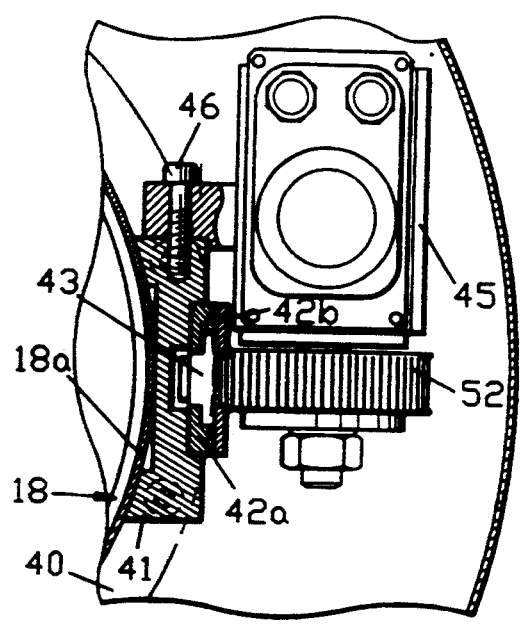
FIG. 4A is a section view along line A—A of FIG. 4.

As can be seen in FIG. 4A, the slideway support 41 carries two lateral slideways 42a and 42b between them and together with closure pieces defining a vertical guide groove 43 arranged along the direction of the generatrices of the ferrule 18a of the support 18.

A motor support 45 is fixed by screws 46 onto the guide support 41. Onto the support 45 is fixed a geared reduction motor 48 whose output shaft 48a carries a bevel gear 49 meshing with a second bevel gear 50 keyed onto a shaft 51 mounted for rotation in the motor support 45 by means of rolling-contact bearings.

The shaft 51 carries a toothed pulley 52 over which passes a toothed belt 53 for driving the flexible strip carrying the Eddy current sensor, the flexible strip 55 and the toothed belt 53 being secured by a linking piece 56 constituting a carriage for guiding the belt and the flexible strip between the slideways 42a and 42b.

Figure 4B:
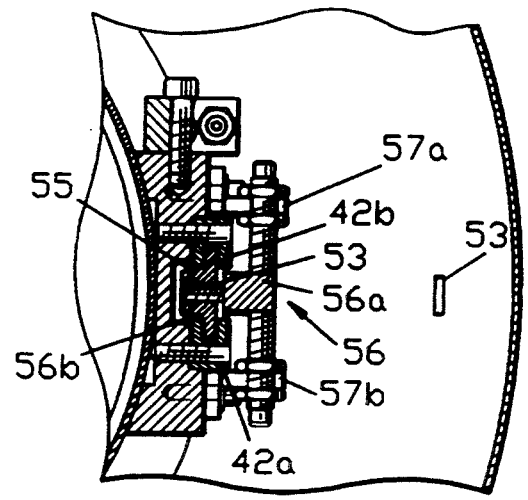
FIG. 4B is a section view along line B—B of FIG. 4.
Figure 5A:
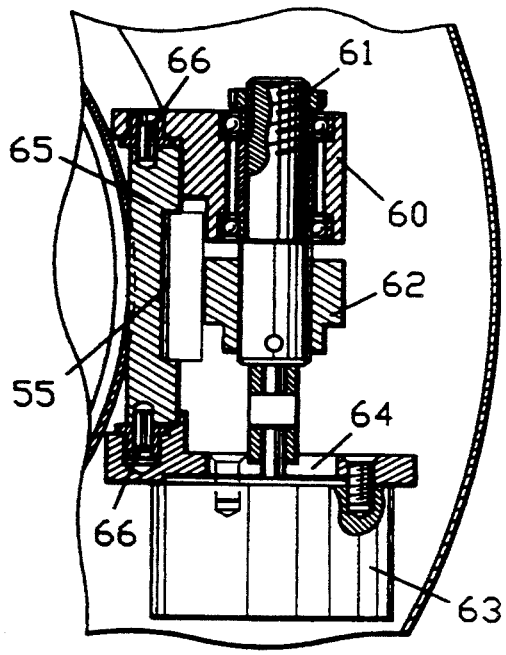
FIG. 5A is a section view along line A—A of FIG. 5.

The carriage 56 providing the link between the toothed belt 53 and the flexible strip 55 as well as the guidance of the flexible strip between the slideways 42a, 42b has been represented in FIG. 4B.

The carriage 56 includes two pieces 56a and 56b fixed on one another by screws, between which the toothed belt 53 is clamped.

The flexible strip 55 is fixed onto the piece 56b by the screws which assemble the pieces 56a and 56b and which clamp the belt 53. The piece 56a projecting outwards makes it possible to identify limit positions of the belt and of the flexible strip, by position detectors 57a and 57b arranged in the vicinity of the lower part of the groove 43 and a detector 58 arranged at the upper part of the groove 43 between the guide pieces 42a and 42b.

The slideways 42a and 42b provide guidance for the piece 56a of the carriage and of the flexible strip 55 fixed to the piece 56b.

The slideway support 41 secured to the second support 18 carries, in the vicinity of its upper part, a bearing support 60 in which is mounted a shaft 61 by means of ball bearings.

Onto the shaft 61 is fixed the toothed pulley 62 constituting the return pulley for the toothed belt 53 driven by the geared reduction motor 48.

The support 41 carries, by means of a flange 64, an encoder 63 which is rotationally driven by the shaft 61, itself rotationally driven by means of the pulley 62 and the belt 53 during the movements of the flexible strip driven by the geared reduction motor 48 and the belt 53.

The encoder 63 makes it possible to define very precisely the movement of the belt 53, which makes it possible to know the position of the flexible strip and of the Eddy current sensor located at the end of this flexible strip as it moves in order to carry out monitoring inside the adaptor 3.

A piece 65 for guiding the flexible strip 55 is mounted so as to pivot by means of pins 66 (FIG. 5A) between the bearing support 60 and the encoder support 64.

The pivoting guide piece 65 carries slideways 66a and 66b in the extension of the slideways 42a and 42b.

The guide piece 65 is secured to an actuating arm 67 at the end of which is fixed, in an articulated manner by means of a clevis, the rod 68 of a thrust cylinder 69 mounted articulated about a horizontal pin 69a in a two-part support 70 fixed by screws onto the guide support 41.

The movable guide piece 65 may be moved, by means of the arm 67 and of the thrust cylinder 69, between a service position, represented in FIG. 5 and an out-of-service position, represented in FIG. 6.

The corresponding positions of the thrust cylinder are identified by detectors 71 carried by a support 72 secured to the lower part of the body of the thrust cylinder facing which there move projecting reference points secured to an end part 68a of the rod of the thrust cylinder 69.

In its service position, the end part of the movable guide piece 65 bears on the projecting end of the sleeve 5, outside the adaptor 3.

The guide piece 65 provides guidance of the flexible strip 55 constituting the support for the Eddy current detection probe in the extension of the annular space 8 of the adaptor 3.

In order to ensure continuity of the guidance of the flexible strip 55 between the slideways 42a and 42b and the guide piece 65, a flexible strip is fixed at one of its ends onto the end parts of the slideways 42a and 42b and at its other end onto the piece 65, this flexible strip being capable of bending during the movement of the movable piece 65 and of leaving a guidance space to ensure the continuity of the passage of the flexible strip 55 for moving the probe.

The flexible strip 55 carrying the measurement probe may be moved between a retracted position inside the slideways 42a and 42b and an extracted position by rotating the geared reduction motor 48 driving the toothed belt 53 secured to the flexible strip 55.

In its extracted position, the flexible strip 55 is guided by the movable guide piece 65 into the service position represented in FIG. 5, as far as the entrance to the annular space 8 between the adaptor 3 and the sleeve 5.

The subsequent movement of the belt 53 and of the flexible strip 55 makes it possible to insert the flexible strip 55 at the end of which the Eddy current probe is fixed, into the annular space 5 as far as the chosen level in order to carry out the monitoring of the adaptor 3.

Figure 7:
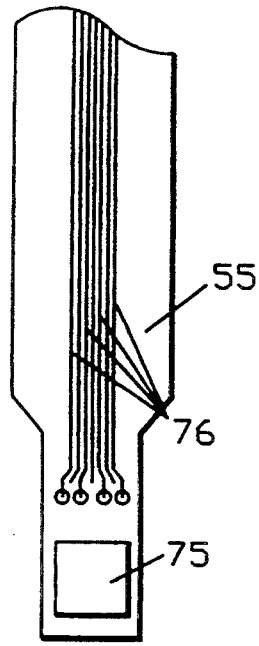
FIG. 7 is a plan view of the end of the flexible strip onto which the measurement probe is fixed.

Preferably the flexible strip 55 represented in FIG. 7 consists of a strip of composite or laminated material consisting of strips of stainless steel; at the end of the flexible strip 55 there are fixed induction coils making it possible to produce measurements by Eddy currents.

Electrical conductors 76 are arranged along the length of the flexible strip 55 so as to power the Eddy current measurement coils and to pick up the measurement signals coming from the coils.

The electrical conductors for powering and picking up the measurement signals are connected, by means of connectors, to supply and measurement cables which make it possible to power the probes and make use of the measurements remotely.

Likewise, the drive means for moving the supports of the monitoring device, of the flexible strip and of the movable guidance piece are powered and controlled remotely.

The position sensors and the encoders making it possible to identify the exact positions of the elements of the monitoring device and the position of the probe are connected by cables to a monitoring station which may be remote from the vessel head which is being monitored.

There will now be described, with reference to the drawings, a monitoring operation inside an adaptor 3 penetrating the head of the vessel of a nuclear reactor which is dismantled and which is placed on a monitoring stand.

The monitoring device 10 according to the invention is fixed to the end of a handling arm which is inserted by movement means inside an enclosure below the head of the vessel and including a lateral closure wall.

The device 10 is placed around the end part of the thermal sleeve 5 of the adaptor which is being monitored by viewing under the head of the vessel by a video camera carried by the handling arm.

The device 10 is engaged around the lower part of the thermal sleeve 5, as represented in FIG. 2.

The devices for guidance by means of rolling-contact bearing 22a, 22b, 22c are placed in the folded-down position by actuating the thrust cylinders 23.

The rolling-contact elements 33 and 34 are brought into contact with the guidance devices 22a, 22b and 22c by adjusting the position of the handling arm.

The thrust cylinder 69 is powered in order to place the movable guide piece 65 in its folded-down service position.

The geared reduction motor 48 is powered in the direction for extracting the flexible strip 55 of the lifting rod for moving the Eddy current probe.

The movement of the flexible strip 55 is continued until the encoders for monitoring the movement have identified an amplitude of movement corresponding to a defined position of the probe in the measurement zone.

The flexible strip 55 is moved over the desired height corresponding to the axial length of the zone to be monitored in the direction of the generatrices of the adaptor, by powering the geared reduction motor 48 so as to make the drive pulley of the toothed belt 53 rotate. Monitoring is thus carried out in a first zone in the direction of the generatrices of the adaptor.

Before carrying out another movement of the strip and of the probe in the axial direction, the support 18 is rotated inside the support 11 by means of the geared reduction motor 24 so as to move it by one step. The adaptor to be monitored is monitored over the entire height of the zone.

Measurements are taken step by step along the generatrices of the adaptor and so as to cover the internal surface of the adaptor over its entire periphery.

Thus, the inside surface of the adaptor 3 is scanned in the measurement zone over the entire length of this zone and over the entire internal periphery of the adaptor. The position and the movements of the support 18 inside the support 11 are identified and followed very precisely by means of an encoder 73 fixed to the sheath 20 of the support 18 and driven in rotation by a gear 73a meshing with the ring gear 15 of the fixed support 11.

The movements and the position of the flexible strip 55 and of the measurement probe in the axial direction of the adaptor are themselves followed very precisely by means of the position encoder 63 associated with the means for moving the toothed belt 53.

The position of the measurement probe is therefore known at any moment, and the possible defects identified on the inside surface of the adaptor may be located very precisely.

The device according to the invention makes it possible to monitor the thermal sleeve of the adaptor without dismantling and without machining.

All the operations may be carried out remotely.

The means for guiding and moving the second support inside the first fixed support may be of a type different from those which have been described.

Different means for moving the flexible strip in the axial direction of the adaptor may also be employed.

The flexible strip of the lifting rod may be produced from a material other than a composite material, and the probe fixed onto the flexible strip may be other than an Eddy current probe.

We claim:

1. Device for monitoring the internal surface of a tubular penetration piece for a head of a nuclear reactor vessel which is cooled by pressurized water, fixed by a weld to said head of said vessel, a thermal sleeve being mounted coaxially inside said penetration piece with radial clearance, said tubular penetration piece comprising a lower end part projecting beneath said head placed in monitoring position after dismantling, said thermal sleeve having an end part projecting with respect to said lower end part, said device including:

(a) a first tubular support having an outer surface carrying means for attachment to a movable handling tool providing a movement in any direction whatsoever in space;

(b) a second tubular support having an inside diameter greater than a diameter of said projecting end part of said thermal sleeve, said second support being mounted coaxially with and able to rotate about its axis inside said first support;

(c) at least three arms mounted so as to pivot on said second support about an articulation pin which is perpendicular to an axis of said second support carrying rolling-contact bearing means;

(d) driving means for rotating said second support about said axis;

(e) a flexible strip carrying a monitoring probe at one end of said flexible strip;

(f) means for supporting and guiding said flexible strip, said means being carried by said second support and being arranged and fixed on said second support in a direction which is substantially parallel to said axis, including an end part mounted so as to pivot about a pin perpendicular to said axis of said second support;

(g) means for moving said strip in translation along an axial direction of said supporting and guiding means;

(h) means for moving said pivoting arms;

(i) means for folding said end part of said means for supporting and guiding said flexible strip down into a service position; and (j) means for controlling a rotational movement of said second support and a translational movement of said flexible strip, said handling tool making it possible to place said device in a service position in which said second support surrounds the lower end of said tubular penetration piece.

2. Device according to claim 1, wherein said first support includes a ferrule at one end of which is fixed an annular assembly for supporting an external race of a rolling-contact bearing and a ring gear coaxial with said annular support.

3. Device according to claim 2, wherein said second support includes a ferrule on one end of which is fixed a sheath including an internal part fixed to said ferrule of said second support, an external part for supporting and fixing an internal race of said rolling-contact bearing and an intermediate part for supporting said pivoting arms and a motor including an output shaft on which is fixed a gear meshing with internal teeth of said ring gear.

4. Device according to claim 3, wherein said pivoting arms are connected in an articulated manner to the end of the rod of a thrust cylinder connected to said second support.

5. Device according to any one of claims 1 to 4, wherein said arms carry, at one end of said arms, two rollers including mutually perpendicular axes and intended to come into contact, in a folded-down service position of said arms, with an outside lateral surface and a lower end of said tubular penetration piece.

6. Device according to any one of claims 1 to 4, wherein said monitoring probe is an Eddy current probe.

7. Device according to any one of claims 1 to 4, wherein said means for supporting and guiding the flexible strip consist of slideways fixed onto an outside surface of said second tubular support.

8. Device according to claim 7, wherein said means for moving said flexible strip in translation along the axial direction of said supporting and guiding means consist of a toothed belt on which is fixed the flexible strip, in a longitudinal direction of said belt, a toothed driving pulley fixed onto an output shaft of a geared reduction motor assembly carried by said second support and a toothed return pulley mounted for rotation on said second support, in a position which is spaced apart in an axial direction of said second support with respect to said toothed driving pulley, said toothed belt constituting an endless belt wound over said toothed driving and return pulleys.

9. Device according to any one of claims 1 to 4, wherein said means for folding said end part of said means for guiding the flexible strip down into the service position, consist of a thrust cylinder, a rod of which is connected in an articulated manner to an arm secured to the end part of said supporting and guiding means and a body of which is connected to said second support.

10. Method for monitoring an internal surface of a tubular penetration piece for a head of a nuclear reactor vessel cooled by pressurized water using a device comprising a first tubular support carrying means for attachment to a movable handling tool, a second tubular support coaxial with and rotating inside said first tubular support, and a thermal sleeve mounted coaxially inside said penetration piece, said method comprising the steps of:

(a) placing said head of said vessel on an intervention stand including a lateral wall below said head of said vessel;
(b) fixing a monitoring device to an end of a handling arm;
(c) moving said handling arm into vertical alignment with said head inside said lateral wall of said intervention stand;
(d) moving said monitoring device to a position coaxial with said tubular penetration piece, and engaging said second tubular support around the lower part of said thermal sleeve;
(e) folding an end part of said means for guiding said flexible strip into a folded-down service position in which said end part comes to bear on a lateral surface of a lower part of said sleeve;
(f) moving said flexible strip in order to insert the probe fixed to its end into the annular space between the sleeve and the tubular piece;
(g) moving said flexible strip in the direction of generatrices of an adaptor in order to monitor a wall of said adaptor over an entire length of a zone to be monitored in the direction of said generatrices of said adaptor;
(h) rotating the second tubular support inside said first tubular support in order to move it by one rotational step;
(i) monitoring said wall of said adaptor again along a zone to be monitored in the direction of the generatrices of the adaptor; and
(j) monitoring the surface of said adaptor step by step over its entire periphery.

* * * * *